E. KEMPER.
Gate.
No. 2,764. Reissued Sept. 10, 1867.
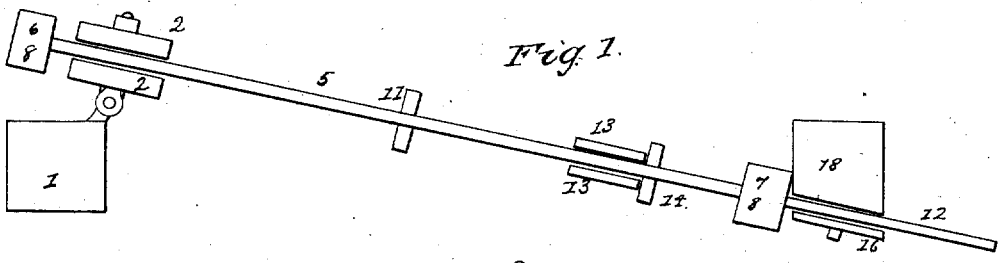
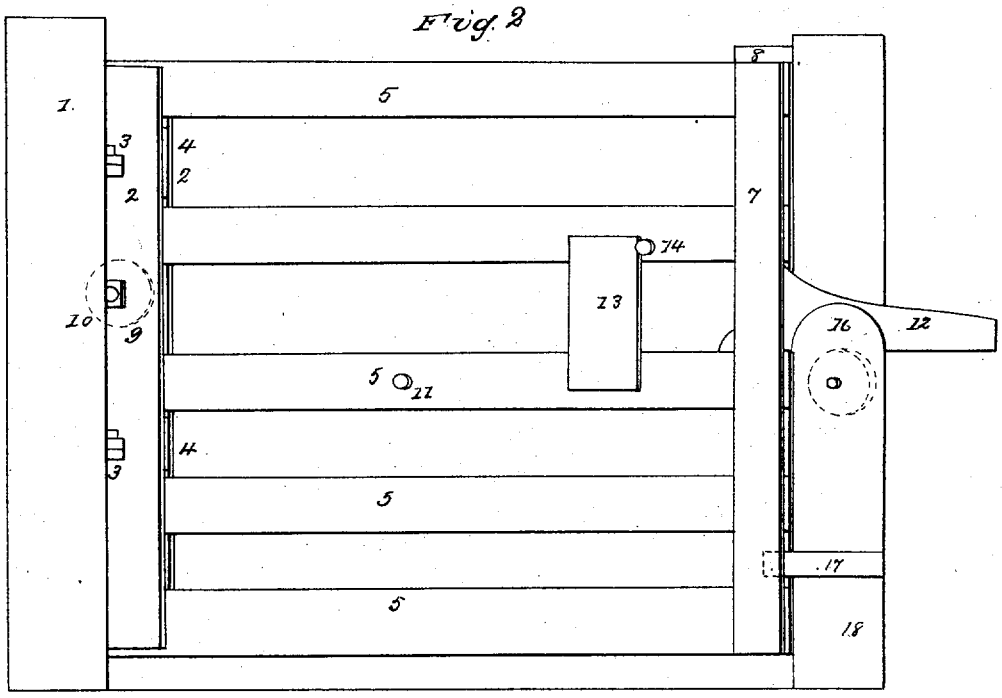
Witnesses
H. A. Battelson Esq.
M. S. White
Inventor
Elijah Kemper
By Thos. J. Lewis
Atty.
N. PETERS, Photo-Lithographer, Washington, D. C.

United States Patent Office.

ELIJAH KEMPER, OF THORN TOWNSHIP, OHIO.

*Letters Patent No.* 35,689, *dated June* 24, 1862; *reissue No.* 2,764, *dated September* 10, 1867.

IMPROVEMENT IN GATES.

The Schedule referred to in these Letters Patent and making part of the same.

TO ALL WHOM IT MAY CONCERN:

Be it known that I, ELIJAH KEMPER, of Thornville, in the county of Perry, and State of Ohio, have invented a new and improved Gate; and I do hereby declare that the following is a full and exact description thereof, reference being had to the accompanying drawings, making part of this specification—

Figure 1 being a top view of a gate constructed according to my improvements.

Figure 2 a side elevation thereof.

Like letters designate corresponding parts in all of the figures.

The leading feature of my invention consists in the combination of the sliding and swinging principles in the construction and operation of a gate; and in the practical application thereof, the gate is so constructed and arranged as to enable it to slide or move endwise one-half (more or less) of its length, or until it is nearly or quite balanced on its support, and then to swing on its central support sufficiently to fully open the gate.

There are many ways, differing in minor and unessential particulars, of applying the principle of my invention to practice. I will proceed to describe the method which I have adopted, but many practical and convenient variations therefrom will be suggested to others, as they have been to me in the course of my study of the main principle.

The gate proper may be constructed in any ordinary manner, but from the fact that it is supported centrally when it swings it does not require a brace or braces to keep it in shape, and it may be quickly and cheaply made of simple horizontal bars or rails, 5 5, connected at their ends by upright battens 6 and 7. The post 1, which supports the gate in swinging, does not require to be so large and rigid as are the hinge-posts of ordinary gates, since the gate exerts no leverage upon it, but is merely supported close beside it. In order to furnish guides for the gate to slide in, and at the same time a support for it to swing on, a simple and effectual device consists of two upright strips, 2 2, separated by blocks or otherwise, so as to freely admit the rails of the gate between them, and thus be secured parallel to each other, substantially as represented in the drawings. Between these guides a friction-roller or pulley, 9, is located, turning on journals 10 10, which have their bearings in said guides. This friction-roller supports one of the rails of the gate—the upper rail but one, as shown in the drawings. When the gate is moved endwise it rides on this friction-roller, and thereby moves easily. The guide-strips or bars 2 2 together compose a post or stile, which is or may be hinged to the post 1 by hinges 3 3. The gate, when slid back half its length, swings with or between these guides as its axis. The guides may have any other suitable construction or arrangement. A pinion or stop, 11, may be secured to one of the rails of the gate to serve as a limit to determine when the gate has slid to its central position in the guides, by striking the same and preventing the further sliding of the gate in that direction. In winter, or at any other time when it is desired to slide the gate back its whole length, or entirely out of the way, the pin or stop may be removed.

When the gate is drawn forward so as to close the gateway, its forward end, then overbalancing the other end, may simply rest on the ground, and keep its position with considerable security. But, as another feature of my invention, I have applied to the gate a sliding latch, 12, which can be moved between the battens of the gate, and has guide-plates or strips 13 13 on its inner end to keep and guide the same in position. This latch can be slid into the gate out of the way when the gate is opened, and when it is closed the latch can be drawn forward and enter a notch, catch, or hook, 16, at the side of the latch-post 18, substantially as shown, or otherwise. There may be also a friction-roller or pulley, 15, as shown, in this notch or hook, to enable the gate and latch to slide easily. In addition to or in lieu of the latch there may be a stay or catch, 17, attached to the post 18, and projecting into the gateway therefrom, so as to enter between the battens (or into a mortise thereof, if a solid stile is used) of the gate when closed, as represented, and thus hold the gate in position against side or torsional strain. This also may be made to support the forward end of the gate from the ground, if desired. When the gate is pushed back or drawn forward, its forward end is held up by hand, or it may be drawn or pushed along the ground.

Among the advantages of this invention, in addition to the simplicity, cheapness, and lightness of construction which it allows, and its not being liable to strain, as above indicated, are its capability of being opened little or much, and of retaining its position, to whatever extent opened; the comparatively little space required to swing in; its capability of variation in position while swinging, so as to avoid obstructions, and of being moved entirely out of the way when open, as in winter; and its value in use for separating stock as they pass through the gateway, by readily closing endwise against any that attempt but are not desired to go through. At the same time it retains nearly all the advantages of an ordinary swinging gate.

What I claim as my invention, and desire to secure by Letters Patent, is—

A gate arranged so as to have both a sliding and swinging movement to open and close it, substantially as and for the purposes herein specified.

I also claim a gate so arranged that it may slide till it is supported centrally, and then swing, balanced on its support, substantially as herein set forth.

I also claim, in combination with a sliding and swinging gate, a guide or guides, which shall serve both to direct the sliding of the gate and to support it for and allow its swinging, substantially as herein specified.

I also claim the combination of a sliding latch with a sliding and swinging gate, substantially as and for the purpose herein set forth.

The above specification of my improved farm-gate signed by me this 27th day of May, 1867.

ELIJAH KEMPER. [L. S.]

Witnesses:

W. H. SCHENCK,

JACOB DUNWOODY.